United States Patent [19]

Fullenkamp

[11] Patent Number: 4,991,674
[45] Date of Patent: Feb. 12, 1991

[54] FORKLIFT TRUCK BATTERY RETAINER WITH SPRING

[75] Inventor: Todd M. Fullenkamp, Ft. Recovery, Ohio

[73] Assignee: Crown Equipment Corporation, New Bremen, Ohio

[21] Appl. No.: 391,349

[22] Filed: Aug. 9, 1989

[51] Int. Cl.⁵ .............................................. B60R 16/04
[52] U.S. Cl. .................................. 180/68.5; 248/503; 224/273
[58] Field of Search ............................ 180/68.5, 68.4; 108/106, 110; 211/72, 86; 224/902, 273; 248/503, 352; 296/37.1

[56] References Cited

U.S. PATENT DOCUMENTS

| | | | |
|---|---|---|---|
| 1,112,321 | 9/1914 | Queeney | 180/68.5 |
| 4,140,192 | 2/1979 | Sharpe | 180/68.5 |

Primary Examiner—Charles A. Marmor
Assistant Examiner—Richard Camby
Attorney, Agent, or Firm—Biebel, French & Nauman

[57] ABSTRACT

A battery retainer mechanism for use in vehicles having a battery is provided which may comprise a battery retainer plate, wedge, retainer for the wedge, a handle, handle guide, and spring means. The battery retainer mechanism utilizes two forces: a downward force and a first frictional force between the battery engaging surface and the battery. A method of retaining a battery in place in a vehicle equipped with the battery retainer mechanism of this invention is also disclosed.

18 Claims, 5 Drawing Sheets

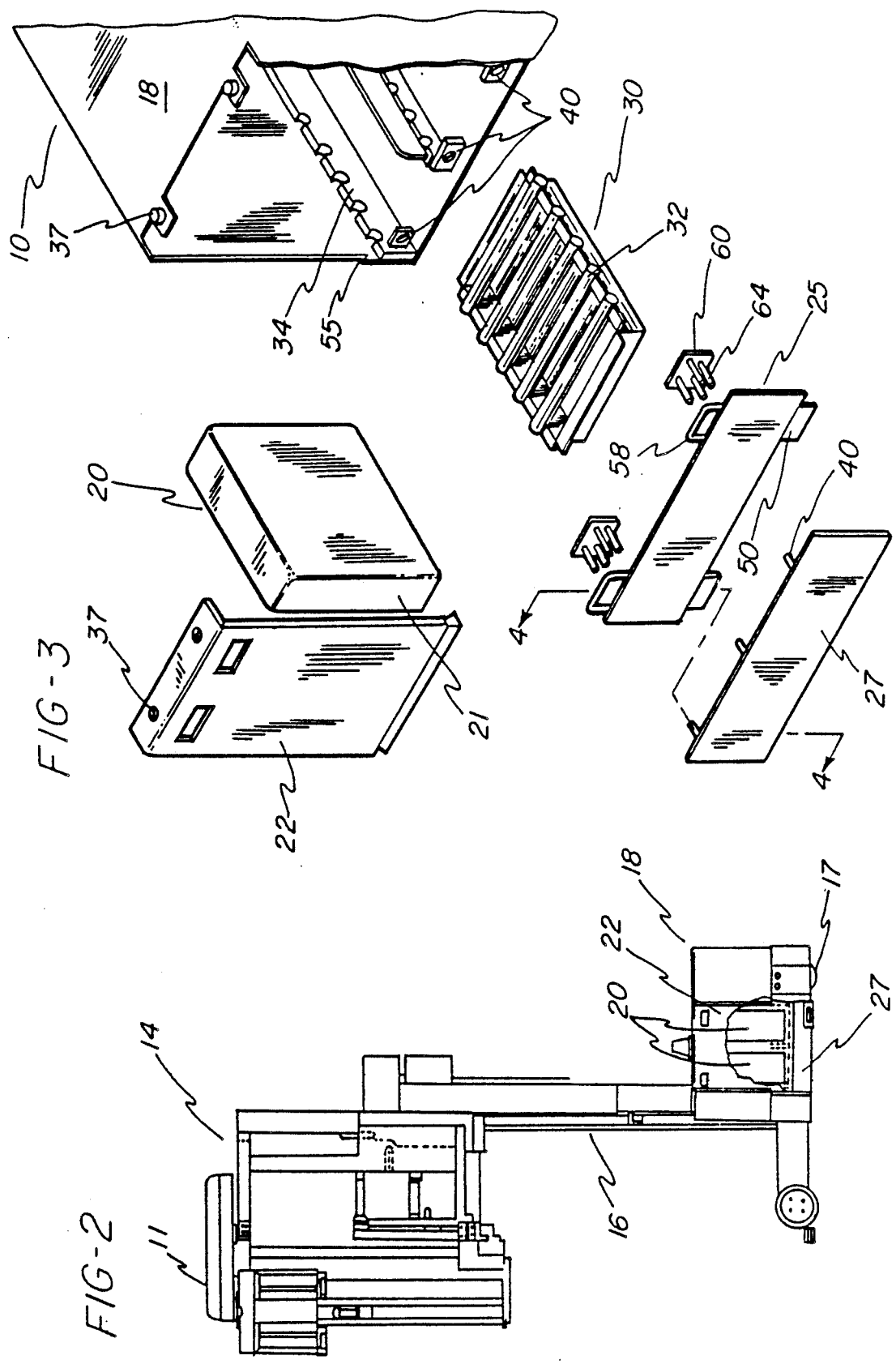

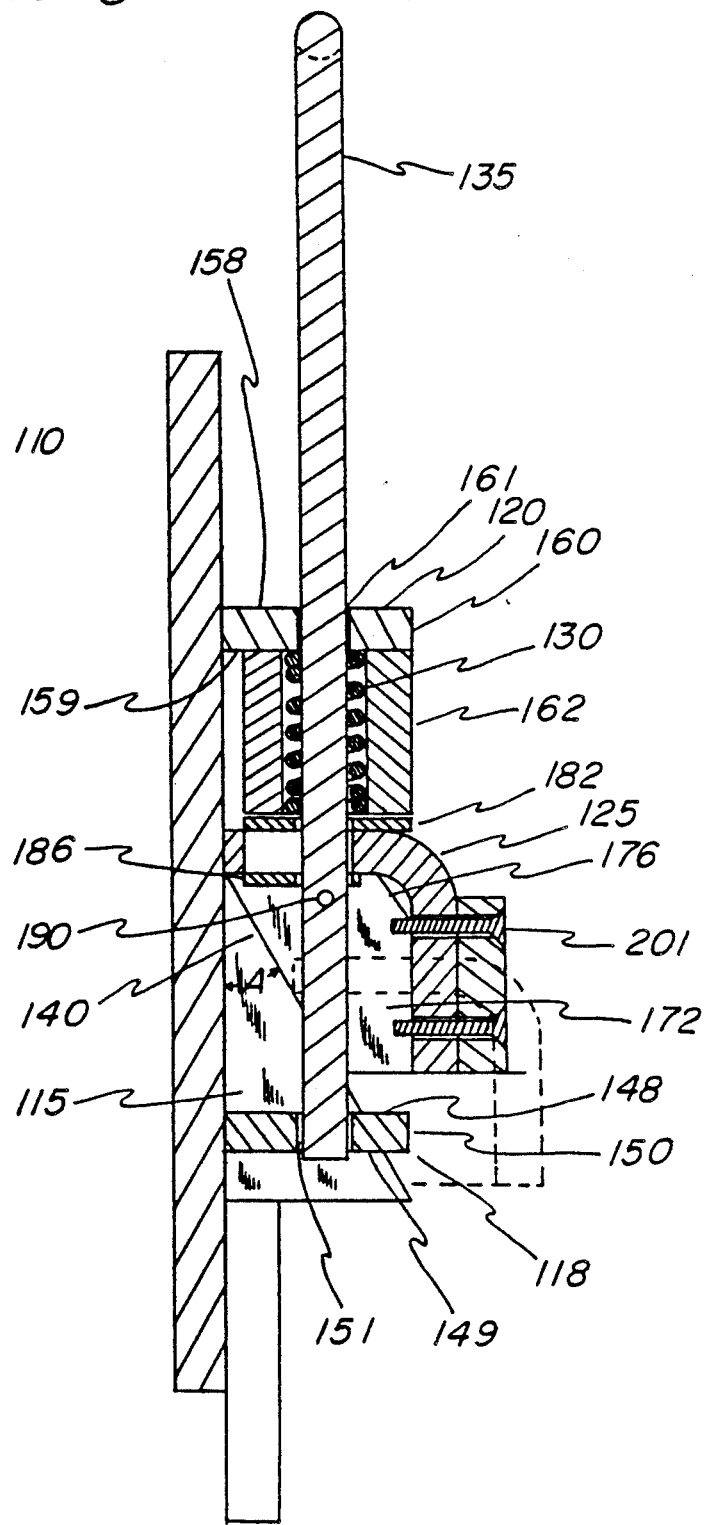

FORKLIFT TRUCK BATTERY RETAINER WITH SPRING

BACKGROUND OF THE INVENTION

The present invention relates to battery retaining mechanisms for use with forklift trucks and, more particularly, to such a device which is easily releasable.

Forklift trucks are typically used to transport and handle goods and containers which are relatively large or heavy. Forklift trucks may be powered by an electric D.C. motor connected to rechargeable storage batteries which are carried on the truck. The batteries are typically 12, 24, 36, 48 or 72 volts. Some forklift truck models weigh more than 8,000 pounds, with the batteries alone weighing several hundred pounds.

A pair of lift forks are mounted on an extendable fork mast for engaging the goods or containers being handled. The forks are raised as the goods or containers are carried by the truck. Additionally, the forks may be raised quite high, depending upon the construction of the truck, in order to position the goods or containers on a storage rack or to remove the goods or containers from such a rack.

Normally, a battery is rolled into the battery compartment until it rests against the rear wall of the battery compartment. A battery retainer, designed to keep the battery in the battery compartment can be secured to the side wall of the truck, however, typically a gap exists between the battery and battery retainer, to allow for battery length variations thus permitting the battery to roll back and forth while the truck is in an operative mode. The length of the tolerance of the batteries is typically 3/32", such that two batteries could differ up to 3/16" in length.

This variation in battery length permits the battery to effectively crash into the battery retaining plate, which plate is held on to the forklift by an upwardly projecting section of sheet metal which is part of the structural housing of the power unit. The banging of the shifting batteries also irritates the forklift driver. Furthermore, in forklift trucks having rear steer wheels and guidance systems, lateral shifting of the batteries might adversely affect the accuracy of the steering especially when the vehicle is in the automatic guidance mode.

Attempts have been made to remedy the above situation by furnishing a spacer means which is typically formed from a planar spacer plate located parallel to the side wall of the truck. The plate is secured to a U-shaped plate, the legs of which are welded to the retainer plate. The planar bottom portion of the U-shaped plate is also located parallel to the side wall of the truck. The spacer plate is secured to the U-shaped plate by countersunk fastening means, which extend into the space between the U-shaped plate and the battery retainer plate.

Unfortunately, the use of such spacers presents practical limitations. For example, if the battery presses so hard against the spacer that the spacer becomes wedged against the U-shaped plate, removal of the plate for purposes of changing the battery is made extremely difficult. This problem is compounded by the fact that these batteries must be recharged at the end of each eight or twelve hour shift. The inconvenience associated with freeing the battery retainer plate can constitute an unnecessary, or at least an unwelcome, expenditure of time, money and energy.

Still another problem related to existing spacer means is the fact that since the batteries can vary slightly in overall length, the distance between the battery retaining plate and the spacer may have to be adjusted as often as every battery change. This adjustment typically is made by means of the screw threaded fastening means members which must be turned one at a time by hand, thereby incurring additional expenditures of time, money and energy. Sometimes the adjustment requires adding an additional spacer between the battery and the existing spacer.

It is thus apparent that the need exists for an improved battery retainer or the like which provides for quick and easy removal of the battery retaining plate while at the same time precluding the side-to-side shifting of the battery in the forklift.

SUMMARY OF THE INVENTION

The problems associated with the prior battery retainers for forklift trucks are overcome in accordance with the present invention by a battery retainer mechanism which has a battery retainer plate, at least one first wedge element associated with the retainer plate and having a first inclined surface, a battery engaging surface, a second wedge element having a second inclined surface, such that the first and second inclined surfaces frictionally engage one another, the angle of the inclined surfaces selected to provide a friction lock for preventing relative movement of the inclined surfaces toward the retainer plate. The battery retainer mechanism may further comprise spring means which are biased against the second wedge element in a downward direction.

The battery retainer mechanism preferably utilizes two forces: a downward force, and a first frictional force being between the battery engaging surface and the battery. The two forces may act on the battery so as to keep it from being displaced. The handle of the battery retainer mechanism can be moved in an upward direction so as to counteract the two forces thereby permitting the second wedge element to move with respect to the first wedge element.

The handle guide means may comprise first handle guide means and second handle guide means, with these handle guide means secured to the battery retainer plate. The first handle guide means is located below the second wedge element, while the second handle guide means is located above the second wedge element. Preferably the spring means is located between the second handle guide means and the second wedge element.

The first inclined surface of the battery retainer mechanism is inclined with respect to the battery retainer plate and has associated therewith an axis of inclination, with the angle between the battery retainer plate and the axis of inclination being between 20 degrees and 53 degrees. Preferably this angle is approximately 30 degrees.

The first wedge element comprises side walls and a bottom. The second wedge element comprises an upper wedge surface, and a wedge channel which transverses a portion of the upper wedge surface and which extends completely therethrough.

There is also disclosed a method of retaining a battery in place in a vehicle comprising the steps of downwardly urging a wedge element associated with a battery engaging surface against at least one wedge element associated with a battery retainer plate, the wedge elements having inclined surfaces in mating engagement with one another, and laterally urging a battery engaging surface against a battery such that the angle of the inclined surfaces relative to the battery retainer plate provides a friction lock for preventing the relative movement of the wedge element associated with a battery engaging surface toward said retainer plate. Furthermore, exerting an upward force on the second wedge element permits the removal of the battery retainer plate.

It is a primary object of the present invention to provide a battery retainer mechanism which permits the relatively quick and easy removal of a battery from the battery compartment of a forklift truck, yet which provides for the secure retention of the battery in the battery compartment so as to preclude the battery from shifting from side to side in the battery compartment.

A further object of the present invention is to provide a battery retainer which is extremely durable, yet which is conveniently and relatively inexpensively formed.

Still another object of the present invention is to provide a battery retainer which can be utilized with existing forklift trucks without extensive redesign of the housing for the power unit of such trucks.

Other objects and advantages of the invention will be apparent from the following description, the accompanying drawings, and the appended claims.

BRIEF DESCRIPTION OF THE DRAWINGS

FIG. 2 is a side elevational view of a forklift truck with the battery compartment shown through an exploded view.

FIG. 3 is a perspective view of a portion of the side of a prior art power unit showing the various components thereof.

FIG. 8 is a vertical sectional view taken along line 8—8 of FIG. 5.

DETAILED DESCRIPTION OF THE INVENTION

Figure 1:
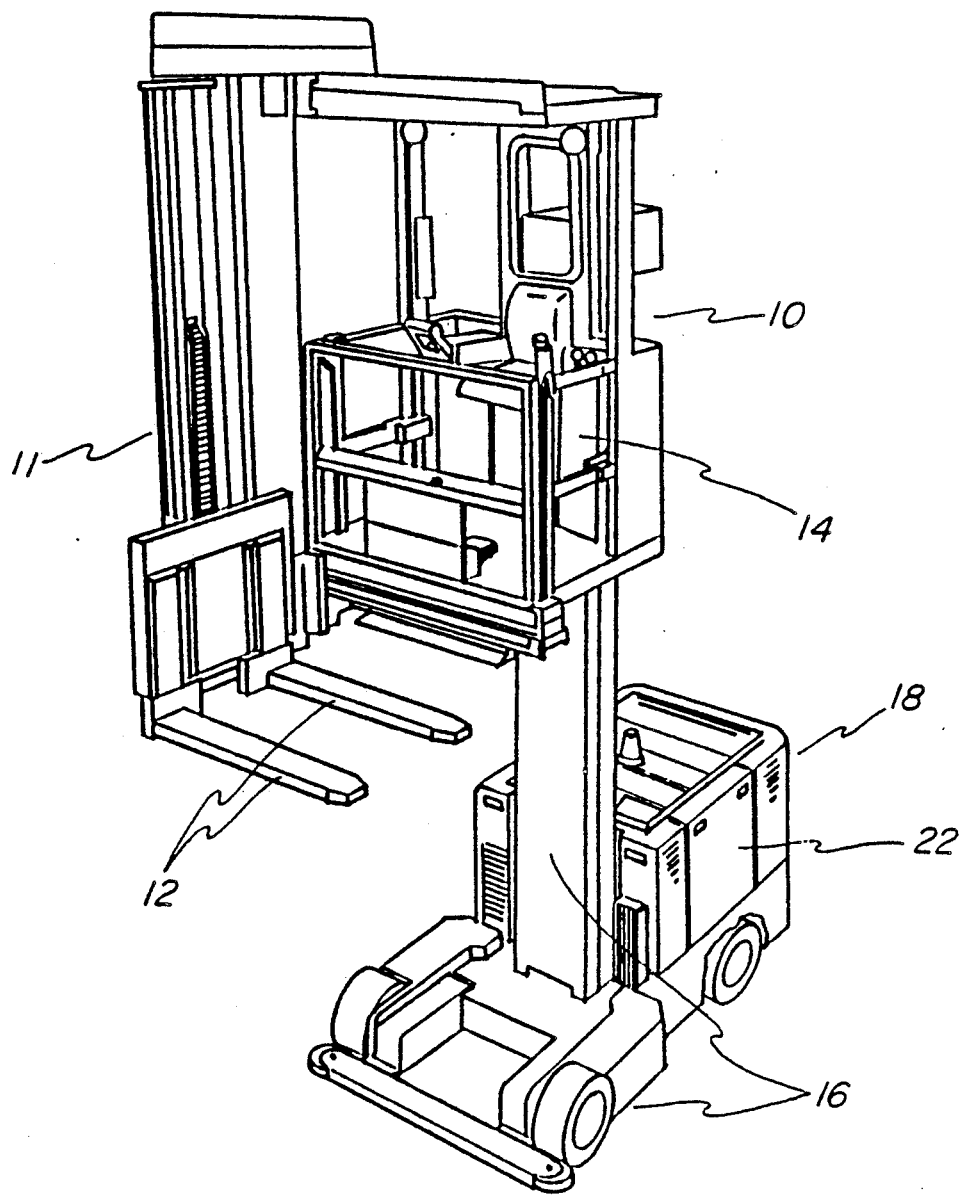
FIG. 1 is a perspective view of a forklift truck.

Having reference to the drawings, attention is directed first to FIGS. 1 and 2 which illustrate a forklift truck of the type with which the battery retainer mechanism of the present invention may be used. The forklift truck 10 includes a load handler assembly 11 having lift forks 12, an operator support platform 14, a mast 16, steer wheels 17 and a power unit 18. Although a forklift type of truck is illustrated, it will be appreciated that the present invention will also find application on any vehicle of the type which utilizes batteries for its power.

As can be better seen in FIG. 2, power unit 18 incorporates at least one battery 20. Depending on the type of forklift, the batteries may either be of 48 or 72 volt capacity, and may include one 48 Volt battery or two 36 volt batteries as shown in FIG. 2, which when combined generate 72 volts. These 48 and 36 volt batteries weigh about 3880 and 1680 pounds respectively.

Figure 4:
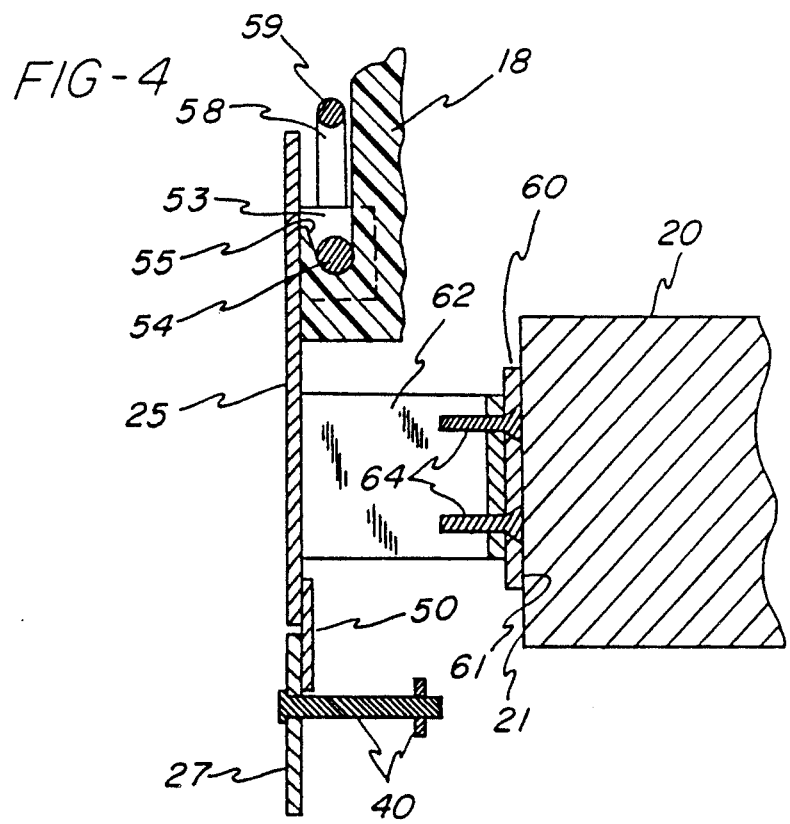
FIG. 4 is a vertical sectional view taken along line 4—4 when the components of FIG. 3 are assembled in the power unit.

FIGS. 3 and 4 disclose various components found in the prior art associated with battery retainers. As can be seen, the end face 21 of battery 20 is positioned adjacent battery cover 22. To retain battery 20 in its battery compartment of the power unit 18, a battery retainer plate 25 is positioned adjacent end face 21. Battery retainer plate 25 is secured to the power unit 18 above a lower skirt weldment 27.

Inside the battery compartment, battery tray 30 is equipped with rollers 32 and is positioned atop roller support 34 such that the heavy batteries may be rolled into operative position inside the compartment. Battery cover 22 is held in place against power unit 18 by cooperative cover fastening means 37, while lower skirt weldment 27 is secured to the power unit 18 by cooperative lower skirt fastening means 40. In FIG. 3 only one tray 30 is shown, but it should be understood that the number of trays is to correspond to the number of batteries.

Retainer plates 50 extend downwardly from the interior of battery retainer plate 25 and lie adjacent the inner surface of lower skirt weldment 27. Near the upper portion of battery retainer plate 25 are a pair of retainer weldments 53 having locking means 54 which engage with bracket 55 of power unit 18.

Battery retainer plate 25 has at least one handle 58 extending upwardly therefrom with handle 58 having a gripping portion 59 which permits battery retainer plate 25 to be removed from bracket 55 by pulling up on the gripping portion.

To accommodate the disparity between the length of the battery compartment and the length of the battery, conventional battery powered vehicles are often provided with a spacer 60 having an inwardly facing surface 61 which makes contact with the end face 21 of battery 20. The spacer 60 is positioned a selected distance inwardly from battery retainer plate 25 against a U-shaped plate 62 so as to hold the battery 20 in a relatively fixed position. Countersunk spacer fastening means 64 secures spacer 60 to battery retainer plate 25.

Typically after an eight or twelve hour shift, the batteries must be removed and replaced. This is accomplished in prior art vehicles by removing battery cover 22, and attempting to pull up on handle 58 of the battery retainer plate 25. If the plate is easily removed, the battery may then be rolled out from the battery compartment and a new one inserted. If difficulty is encountered in pulling up on handle 58, battery 20 normally must be manually pushed away from frictional engagement against spacer 60. Alternatively, spacer fastening means 64 may have to have their length adjusted so as to permit proper frictional engagement between the spacer and the battery.

Figure 5:
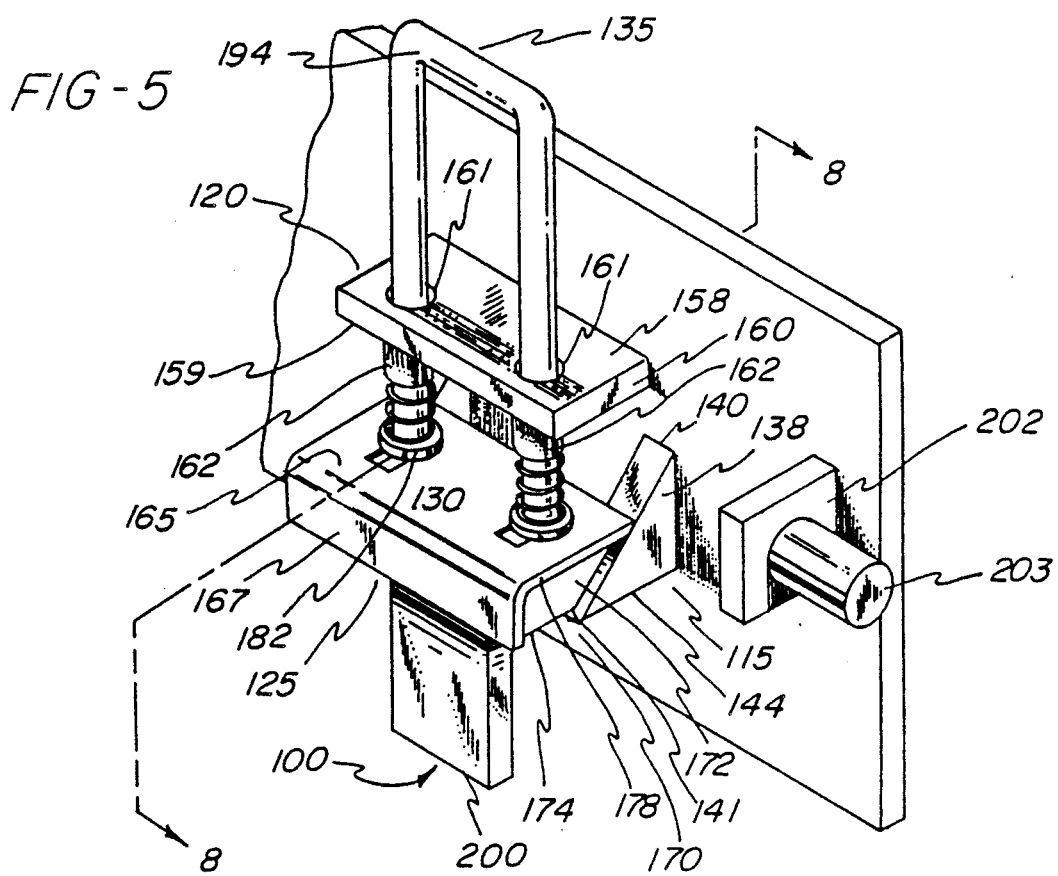
FIG. 5 is a perspective view of a battery retainer in accordance with the present invention.
Figure 6:
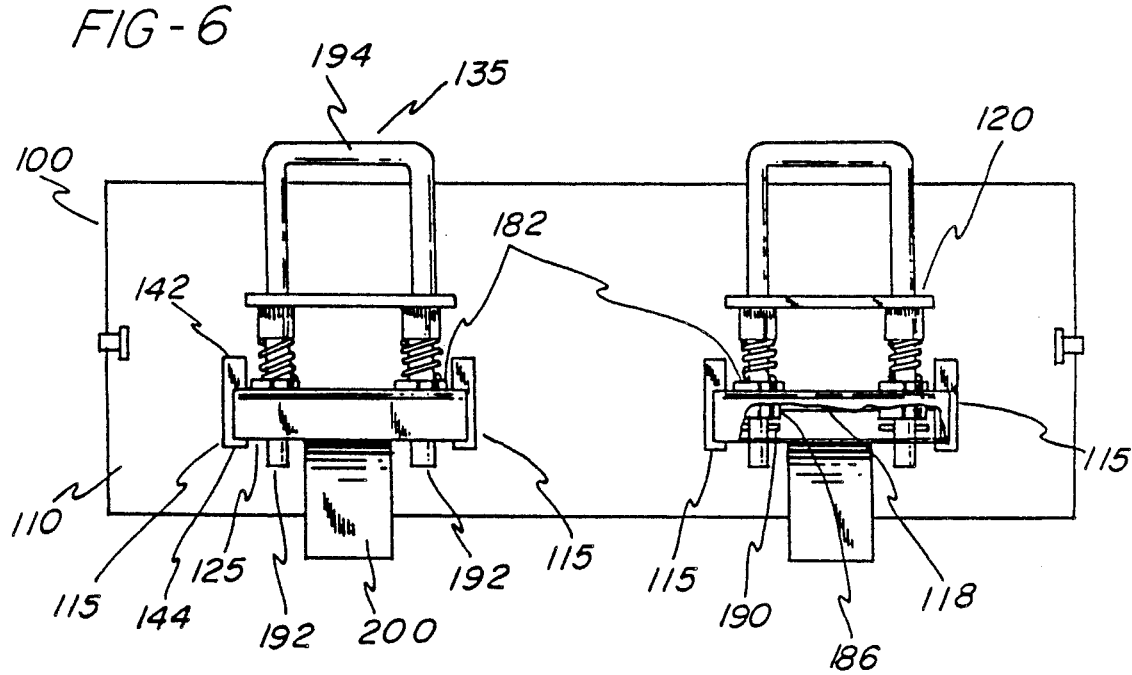
FIG. 6 is a front elevational view of the entire battery retainer of FIG. 5.

FIGS. 5 and 6 illustrate an improved battery retainer mechanism made in accordance with the present invention designated generally by the numeral 100. The battery retainer mechanism of this invention also comprises a battery retainer plate 110 substantially similar to the retainer plates currently found in the prior art. Battery retainer mechanism 100 also comprises wedge retaining means 115, first handle guide means 118, second handle guide means 120, wedge means 125, spring means 130 and handle 135.

The wedge retaining means 115 are best shown in FIGS. 5 and 6, wherein they can be seen as comprising side walls 138, preferably parallel to one another and disclosed as having their vertical axis oriented parallel to the vertical axis of battery retainer plate 110, such that side walls 138 are normal to battery retainer plate 110. The wedge retaining means or first wedge element has a first inclined surface extending downwardly from battery retainer plate 110 to bottom 144.

First handle guide means 118 is visible in FIGS. 6 and 8 where it is seen as comprising a relatively flat plate having an upper surface 148, lower surface 149, peripheral edge 150 and an aperture 151 which corresponds to the number of portions of handle 135 which extend through the first handle guide means 118. In the preferred embodiment of the invention, handle 135 is formed with two vertically depending portions such that two apertures 151 are formed in first handle guide means 118. The plate which serves as first handle guide means 118 preferably has its horizontal axis oriented perpendicular to the vertical axis of battery retainer plate 110 such that the first handle guide means is normal thereto.

Second handle guide mèans 120 is configured substantially the same as first handle guide means 118. Second handle guide means 120 has an upper surface 158, a lower surface 159, a peripheral edge 160, and apertures 161 which correspond to the portions of handle 135 which extend therethrough. Additionally, cylindrical guide means 162 are provided. These substantially cylindrical guide means 162 are shown as depending from the lower surface 159 of second handle guide means 120. The upper portion of spring means 130 are located between the handle and the interior surface of the cylindrical guide means 162. The apertures 151 and 161 are aligned to permit the simultaneous passage therethrough of portions of handle 135.

Second wedge element 125 comprises an upper surface 165 with second wedge element channel 166 transversing a portion of upper surface 165 and extending completely therethrough. Wedge channel 166 is oriented such that it is also aligned with apertures 151 and 161. Wedge channel 166 permits the passage through wedge means 125 of handle 135. Wedge means 125 also comprises an inwardly facing surface 167 which in the operative embodiment of the invention frictionally engages with the end face 21 of battery 20. As shown best in FIGS. 5 and 8 inwardly facing surface 167 curves downwardly from upper surface 165. Preferably, inwardly facing surface 167 has its vertical axis oriented parallel to the vertical axis of battery retainer plate 110, so as to maximize frictional engagement with battery 20.

Located directly above the upper surface 165 is a first channel sealing means 182. The upper surface of this first channel sealing means 182 is in contact with the lower-most portion of spring means 130. The uppermost portion of spring means 130 is in contact with second handle guide means 120. A second channel sealing means 186 is shown in FIGS. 6 and 8 as being positioned about that portion of the handle which always extends below upper surface 165. The second channel sealing means is secured against a lower position by handle retention means 190 located near the terminal end 192 of each handle. Handle retention means 190 could comprise a cotter pin, while both first and second channel sealing means could be washers. As can be seen, the gripping portion 194 of handle 135 extends above second handle guide means 120 while the terminal end 192 extends below first handle guide means 118.

As in the prior art, the battery retainer plate 110 is provided with at least one retainer plate 200 as well as with a retainer weldment 202 having locking means 203 which can be engaged with conventional bracket 55 of a conventional power unit 18. The battery retainer mechanism of this invention thus can be used with a conventional power unit without extensive redesigning of the power unit. Only the battery retainer plate need be removed from existing units, with the battery retainer plate incorporating this invention serving as its replacement.

Figure 7:
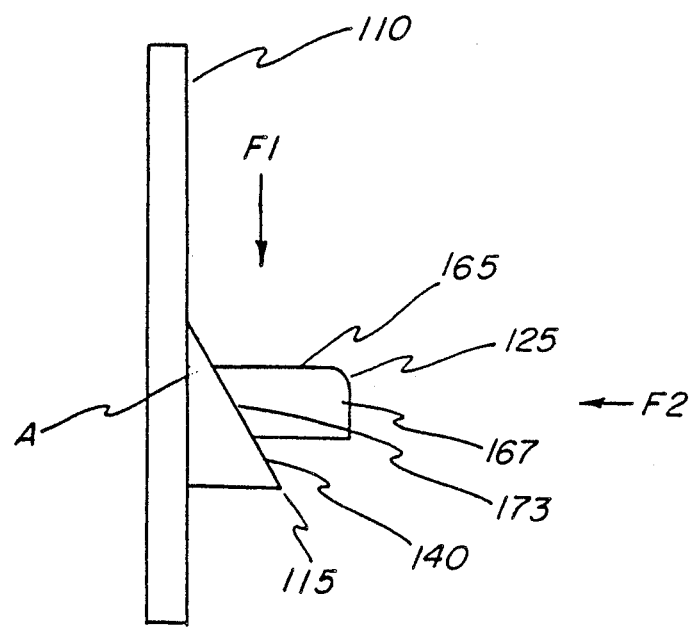
FIG. 7 is a schematic view showing the forces and key angle of the present invention.

The wedge elements are preferably fabricated from steel, such that the battery retainer mechanism is durable, and relatively inexpensive. As can be seen in FIG. 7, it is important to appreciate the angle and forces associated with the first inclined surface 140 given the fabrication of the invention. For example, the coefficient of friction for dry steel is approximately 0.80, while for well-greased steel, the coefficient of friction is approximately 0.16. These coefficients of friction are important given the plurality of forces utilized in the battery retainer mechanism of this invention. There is a first force F1 urging the second wedge element downward as well as a second force F2 urging the battery against the battery engaging surface. First force F1 includes gravity as well as a spring force. The sum of the two forces substantially preclude the movement of the battery.

In operation, the battery retainer plate 110 is secured to power unit 118 by means of locking means 203 in cooperation with retainer plates 200. The second wedge element 125 slides down the first inclined surface 140 as shown in FIG. 8 until the wedge means contacts and frictionally engages end face 21 of the battery. FIG. 8 shows the mechanism in a first position, while the dotted lines show the second wedge element in a second position after the inwardly facing surface 167 has come into contact with the end face 21 of battery 20 which battery is of less length than the one associated with the first position. The second wedge element can move in a lateral direction approximately 6/10" between the two positions shown in FIG. 8. Since the tolerance associated with battery length is 3/16", the second wedge element should be able to automatically readjust following replacement with a new battery, without the addition or deletion of spacer plates.

However, in the unlikely event a spacer 201 is needed, countersunk fastening means 202 are provided. The terminal ends of these fastening means 202 extend into the area between battery retainer plate 110 and second wedge element 125. Spacer 201 is preferably configured the same as the prior art. When a spacer 201 is used, there is no likelihood that the spacer will become wedged between the battery and the retaining plate as in the prior art, due to the easy releasability associated with this invention. Ideally, the wedge works its way by gravity and spring pressure along the first inclined surface until the battery is against the rear wall of the battery compartment so that the battery engaging surface puts a positive force on the battery.

The weight of the sliding wedge plus the spring force, preferably exerts a downward force of 19 pounds. It has been found desirable to have the wedge means weigh 3 pounds, such that each set of springs associated with a handle is responsible for exerting the remaining 16 pounds of downwardly applied force. To encourage the relatively easy sliding of the wedge when a large coefficient of friction exists with respect to the mating inclined surfaces, the angle A between the axis associated with first inclined surface 140 and the battery retainer plate 110 should be greater than 20 degrees. However, so that the wedge means will not be forced up by the battery at low coefficients of friction, the angle should be less than 53 degrees.

It is also important to appreciate that the handle 135 should easily be able to raise the wedge means, thereby permitting the removal of the battery retainer plate. It has been found that although in theory angles between 20 and 53 degrees are workable, more desirable conditions occur when the angle is between 20 and 40 degrees, with optimum conditions occurring when the angle between the axis associated with the first inclined surface 140 and retainer plate 110 is approximately 30 degrees. Ideally the battery engaging surface is parallel to the battery retainer plate.

The battery retainer mechanism disclosed by this invention can be utilized as part of an improved method for retaining a battery in place in a battery powered vehicle. Using this method a battery is placed in the vehicle, a battery retainer mechanism as disclosed by this invention is secured to the vehicle, a wedge element associated with a battery engaging surface is downwardly urged against at least one wedge element associated with a battery retainer plate, the wedge elements having inclined surfaces in mating engagements with one another, and laterally urging said battery engaging surface against said battery such that the angle of the inclined surfaces relative to said battery retainer plate provides a friction lock for preventing the relative movement of the wedge element associated with a battery engaging surface toward said retainer plate. The method may include moving the second wedge element vertically upwardly by a handle, thereby releasing said second wedge element from its friction lock relation.

The battery retainer mechanism may have its spring means exert a downward force on the wedge means. The second wedge exerts force on and frictionally engages the first wedge element along the interface between the first inclined surface 140 and the angled edge 173. The battery engaging surface exerts a force on the battery. The two aforementioned forces act on the battery so as to keep it from being displaced. Exerting an upward force on the handle permits the relatively quick and easy removal of the battery retainer plate as spring 130 becomes compressed thereby significantly reducing the downward force previously having been exerted by the second wedge element and spring means 130 on the first wedge element 115.

While the forms of apparatus and method herein described constitute a preferred embodiment of this invention, it is to be understood that the invention is not limited to this precise form of apparatus or method and that changes may be made therein without departing from the scope of the invention which is defined in the appended claims.

What is claimed is:

1. A releasable battery retainer mechanism for closing one end of a battery compartment housing heavy batteries of the type used to power vehicles, said retainer comprising
   a battery retainer plate for closing one end of the battery compartment,
   at least one wedge element associated with said retainer plate, said wedge element having a first inclined surface,
   a second wedge element having a second inclined surface in mating engagement with said first inclined surface,
   a battery engaging surface associated with said second wedge element for holding the battery in its compartment without lateral movement,
   the angle of said first and second inclined surfaces being selected to provide a friction lock for preventing relative movement of the inclined surfaces toward said retainer plate,
   and means for releasing said second wedge element from its friction lock relation with said first wedge element thereby to permit removal of said battery from its compartment.

2. The retainer mechanism of claim 1 further including
   spring means for urging said wedge elements together.

3. The retainer mechanism of claim 1 further including a handle for moving said second wedge element vertically upwardly.

4. The retainer mechanism as claimed in claim 1 wherein said battery engaging surface is parallel to said battery retainer plate.

5. The retainer mechanism as claimed in claim 2 wherein said spring means is biased against said first wedge element in a downward direction.

6. The retainer mechanism as claimed in claim 2 which utilizes two forces: a downward force and a first frictional force, said first frictional force being between said battery engaging surface and said battery.

7. The retainer mechanism of claim 3 further including handle guide means comprising first handle guide means and second handle guide means, said handle guide means secured to said battery retainer plate, said first handle guide means located below said second wedge element, said second handle guide means located above said second wedge element.

8. The retainer mechanism as claimed in claim 1 wherein said first inclined surface is inclined with respect to said battery retainer plate, said first inclined surface having associated therewith an axis of inclination, with the angle between said battery retainer plate and said axis of inclination being between 20 and 53 degrees.

9. The retainer mechanism as claimed in claim 8 wherein said angle is between 20 and 40 degrees.

10. The retainer mechanism as claimed in claim 8 wherein said angle is approximately 30 degrees.

11. The retainer mechanism as claimed in claim 1 wherein said first wedge element associated with said retainer plate has side walls, and a bottom.

12. The retainer mechanism as claimed in claim 1 wherein said second wedge element has an upper surface, and has a wedge channel which transverses a portion of said upper surface and which extends completely therethrough.

13. A releasable retainer mechanism for use in vehicles having a battery, said mechanism comprising
   a battery retainer plate,
   one wedge element associated with said retainer plate, said one wedge element having side walls and a bottom, said one wedge element having a first inclined surface, said first inclined surface inclined with respect to said battery retainer plate, said first inclined surface having associated therewith an axis of inclination, with the angle between said battery retainer plate and said axis of inclination being between 20 and 53 degrees,
   a second wedge element having a second inclined surface which frictionally engages said first inclined surface, said second wedge element associated with a battery engaging surface element which frictionally engages said battery, said second wedge element having an upper wedge surface, said second wedge element having a wedge channel which transverses a portion of said upper wedge surface and which extends completely therethrough, a handle, handle guide means, said handle guide means including first handle guide means and second handle guide means, said handle guide means secured to said battery retainer plate, said first handle guide means located below said second wedge element, said second handle guide means located above said second wedge element and spring means, said spring means located between said second handle guide means and said second wedge element to urge said wedge elements together.

14. The battery retainer mechanism as claimed in claim 13 which utilizes two forces: a downward force and a first frictional force being between said battery engaging surface and said battery, the sum of said forces substantially precluding movement of said battery.

15. The battery retainer mechanism as claimed in claim 13 wherein said angle is approximately 30 degrees.

16. The battery retainer mechanism as claimed in claim 13 wherein said handle can be moved in an upward direction so as to permit said second wedge element to move vertically upwardly.

17. A method of retaining a battery in place in a battery compartment housing heavy batteries of the type used to power vehicles comprising the steps of downwardly urging a wedge element associated with a battery engaging surface against at least one wedge element associated with a battery retainer plate, said wedge elements having inclined surfaces in mating engagement with one another, and laterally urging said battery engaging surface against said battery such that the angle of the inclined surfaces relative to said battery retainer plate provides a friction lock for preventing the relative movement of the wedge element associated with a battery engaging surface toward said retainer plate.

18. The method of claim 17 comprising the step of having the second wedge element moveable vertically upwardly by a handle, thereby releasing said second wedge element from its friction lock relation.

* * * * *